Warner and Thoma's Method Of Producing Butter.

No. 100224 — Patented Feb 22 1870

Witnesses: Chas H. Tryon, Alfred P. Wells

Inventors: Stanton D. Warner, Owen W. Thomas

United States Patent Office.

STANTON D. WARNER AND OWEN W. THOMAS, OF RICHMOND, ILLINOIS.

Letters Patent No. 100,224, dated February 22, 1870.

IMPROVEMENT IN APPARATUS FOR PRODUCING BUTTER FROM CREAM.

The Schedule referred to in these Letters Patent and making part of the same.

To all whom it may concern:

Be it known that we, STANTON D. WARNER and OWEN W. THOMAS, of Richmond, in the county of McHenry, and State of Illinois, have invented certain new and useful Improvements in the Manufacture of Butter; and do hereby declare that the following is a full, clear, and exact description thereof, reference being had to the accompanying drawings and to the letters of reference marked thereon.

The nature of our invention consists in the construction and arrangement of an apparatus for manufacturing butter from milk or cream by pressure and filtration.

In order to enable others skilled in the art to which our invention appertains to make and use the same, we will now proceed to describe its construction and operation, referring to the annexed drawings, which form a part of this specification, and in which—

Figure 2:
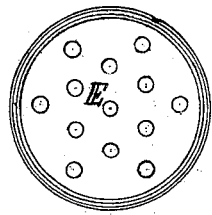
Figure 1:
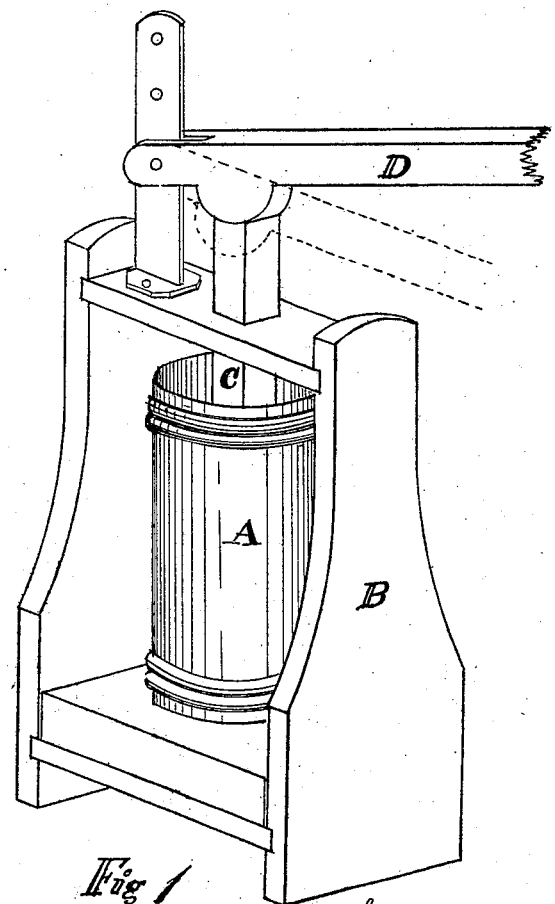

Figure 1 is a perspective view of our apparatus;
Figure 2 is a plan view of the plunger; and
Figure 3 is a vertical section of the same.

A represents a circular vessel or cylinder of any suitable size placed within the frame B, and having a plunger, E, operating within the same.

Figure 3:

The plunger E, which is perforated with a number of holes, as seen in figs. 2 and 3, is hollow or concave on its under side, and in this cavity is placed some suitable fibrous filtering substance F, covered on the under side with cloth.

The bottom of the cylinder A is also perforated, and on its upper side provided with a similar cavity filled with fibrous substance and covered with cloth.

The filtering substance used in the bottom of the cylinder A and in plunger E should be of sufficient density to prevent the buttery substances of cream or milk from passing through, but, however, sufficiently porous to allow the serous or superfluous matter to escape.

The milk or cream being placed in the cylinder A, and the plunger E placed on top of the same, said plunger fitting snugly within the cylinder, pressure is applied in the following manner:

On the frame B is an upright, to which a lever, D, is pivoted, said lever being at its outer end, which is not shown in the drawing, provided with a weight.

To the lever D is pivoted a bar, C, which extends downward through the frame into the cylinder A, and may or may not be attached to the plunger E.

The weighted lever D causes the bar C to press the plunger E down on the milk or cream, when all the serous or superfluous substances will be pressed through the filtering-bottom and plunger, retaining the buttery substances only. When this is accomplished, the butter is taken out and worked in the usual way.

The lever D can be adjusted on the upright to which it is pivoted, so as to accommodate the apparatus to any quantity of milk or cream it is desired to subject to this treatment.

Having thus fully described our invention,

What we claim as new, and desire to secure by Letters Patent, is—

The construction and arrangement of the cylinder A, having a perforated concave bottom, perforated concave plunger E, filtering substance F, bar C, and adjustable weighted lever D, substantially as shown and described.

STANTON D. WARNER.
OWEN W. THOMAS.

Witnesses:
CHAS. H. TRYON,
ALFRED P. WELLS.